United States Patent
Ruthner

(10) Patent No.: US 8,114,186 B2
(45) Date of Patent: Feb. 14, 2012

(54) METHOD FOR PRODUCING IRON POWDER RESPECTIVELY MICROALLOYED STEEL POWDER MAINLY FOR METALLURGICAL APPLICATIONS AND METHOD FOR PRODUCING THEREOF

(75) Inventor: Michael J. Ruthner, Nussdorf am Attersee (AT)

(73) Assignee: Michael J. Ruthner, Nussdorf am Attersee (AT)

( * ) Notice: Subject to any disclaimer, the term of this patent is extended or adjusted under 35 U.S.C. 154(b) by 727 days.

(21) Appl. No.: 11/949,283

(22) Filed: Dec. 3, 2007

(65) Prior Publication Data
US 2008/0175740 A1    Jul. 24, 2008

(30) Foreign Application Priority Data

Dec. 1, 2006 (EP) .................................... 06024908

(51) Int. Cl.
*B22F 9/18* (2006.01)
*C22C 1/04* (2006.01)

(52) U.S. Cl. ................... 75/369; 419/1; 419/23; 419/38

(58) Field of Classification Search ................ 75/343, 75/353, 354, 357, 359–361, 363–365, 369, 75/10.39, 10.45, 392, 414, 416, 419, 420, 75/425, 430, 433, 436, 443–457, 474–484, 75/486, 488–498, 505, 707; 423/138, 150.6, 423/632–634; *C01G 49/00, 49/02, 49/04, C01G 49/06, 49/08; C21B 13/00, 13/02, C21B 13/04, 13/06, 13/08, 13/10, 13/12, C21B 13/14*
See application file for complete search history.

(56) References Cited

U.S. PATENT DOCUMENTS

| | | | |
|---|---|---|---|
| 2,217,569 A | 10/1940 | Stephan | |
| 2,853,767 A | 9/1958 | Burkhammer | |
| 3,139,955 A | 7/1964 | Dombeck | |
| 3,671,228 A * | 6/1972 | McIntire et al. | 419/4 |
| 3,677,749 A | 7/1972 | McCurdy et al. | |
| 3,975,186 A | 8/1976 | Grebe et al. | |
| 6,863,877 B2 * | 3/2005 | Walsdorff et al. | 423/632 |
| 2003/0110889 A1 | 6/2003 | Uenosono et al. | |
| 2004/0097768 A1 * | 5/2004 | Walsdorff et al. | 585/444 |

FOREIGN PATENT DOCUMENTS

| DE | 1125 459 | 3/1956 |
|---|---|---|
| DE | 1425 195 | 3/1962 |

(Continued)

OTHER PUBLICATIONS

Oberteuffer, John A., "Magnetic Separation: A Review of Principles, Devices, and Applications," IEEE Transactions on Magnetics, vol. Mag-10, No. 2, Jun. 1974, pp. 223-238.*

(Continued)

*Primary Examiner* — Scott Kastler
*Assistant Examiner* — Vanessa Luk
(74) *Attorney, Agent, or Firm* — Crowell & Moring LLP

(57) ABSTRACT

A method for manufacturing of iron—respectively microalloyed steel powders, starting from fluffy spray roasted iron oxides exhibiting a specific surface area in excess of 2.0 m²/g and residual chloride contents over 440 ppm Cl', decrease the chloride content in two steps to less than 100 ppm, the specific surface area (BET) of to a pre-selected value of less than 10.0 m²/g, preferably between 0.1 and 2.0 m²/g and reduce the pre-sintered granules exhibiting a bulk density in excess of 1.200 g/dm³.

16 Claims, 1 Drawing Sheet

FOREIGN PATENT DOCUMENTS

| | | |
|---|---|---|
| EP | 0 232 246 A2 | 8/1987 |
| EP | 0 232 246 B1 | 8/1987 |
| GB | 1 219 674 A | 1/1971 |
| GB | 1 288 252 | 9/1972 |
| JP | 63-222019 * | 9/1988 |

OTHER PUBLICATIONS

B. Lynn Ferguson and Randall M. German, "Powder Compaction Methods," vol. 7: Powder Metal Technologies and Applications, ASM Handbooks Online, ASM International, 2002.*

German, Randall M. "Powder Injection Molding," vol. 7: Powder Metal Technologies and Applications, ASM Handbooks Online, ASM International, 2002.*

W.B. James and G.T. West, "Alloying Methods," vol. 7: Powder Metal Technologies and Applications, ASM Handbooks Online, ASM International, 2002.*

"Spray Drying and Granulation," vol. 7: Powder Metal Technologies and Applications, ASM Handbooks Online, ASM International, 2002.*

Professional translation of JP 63-222019, originally published in the Japanese language on Sep. 14, 1988.*

European Search Report dated Aug. 1, 2007 (Ten (10) pages).

English translation of Chinese Patent Application No. 200710194067.3 Office Action (Three (3) pages).

* cited by examiner

Process Flow Sheet
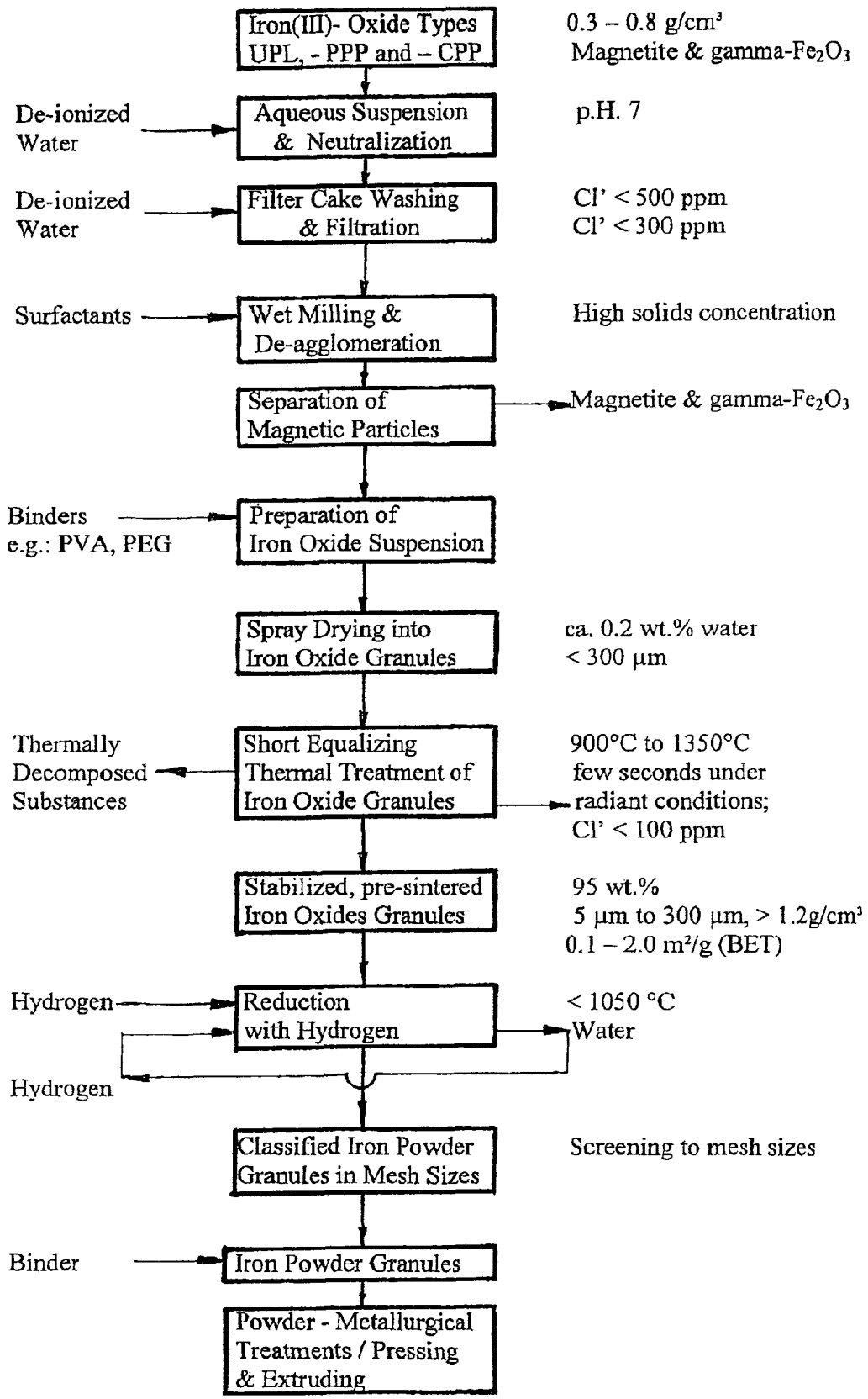

METHOD FOR PRODUCING IRON POWDER RESPECTIVELY MICROALLOYED STEEL POWDER MAINLY FOR METALLURGICAL APPLICATIONS AND METHOD FOR PRODUCING THEREOF

TECHNICAL FIELD

The present invention relates to a method for producing powder metallurgical grade iron powders respectively microalloyed steel powders using up-graded regenerated spray roasted iron oxide as a raw material source.

BACKGROUND OF THE ART

According to a method described in EP 0 232 246 B1, spray roasted iron oxides, produced by the regeneration hydrochloric acid waste pickle liquor, originating from de-scaled hot rolled steel strip or plates, is reduced at elevated temperatures between 1200° C. and 1392° C. using gaseous reduction agents, for example hydrogen and consequently cooled.

The specification of spray roasted iron(III)oxide powders, which originate from above mentioned pickle liquor, is influenced by the process- and operation conditions yielding varying chemical and physical data. Particularly there are large differences of the residual chloride content, varying amounts of undesirable magnetic substances, varying values of the specific surface area (BET) and consequently of the iron oxide's primary particle size. Furthermore there are problems to handle fluffy hollow sphere iron oxide granulates.

For reason of unstable material properties spray roasted iron oxides could not, or only to a very small extend, be used as raw material for the production of iron- and steel powders, which are applied to powder metallurgical forming techniques.

Substantially varying salt contents (e.g.: 0.05 to 2.0 wt. % $Cl^-$), unstable varying data of the specific surface area (e.g.: 1.2 to 24.0 $g/m^2$), varying bulk densities (e.g.: 0.3 to 1.2 $g/cm^3$) and alternating contents of magnetic substances (0.1 to 3.0 wt. %) prevent industrial usage of spray roasted iron oxides as raw material for the production of homogenous and for powder metallurgical applications suitable iron- and micro-alloyed steel powders. Iron- and micro-alloyed steel powders used for powder metallurgical processing, require precise material properties for large industrial applications, which are not available by using conventionally traded spray roasted iron oxides.

Changing contents of chlorides yield upon thermal treatment in connection with other ambient elements ($Fe^{2+}$-contents and traces of low melting glasses) to the formation of liquid phases, which promote crystal growth and therefore the material properties of spray roasted iron oxide in an uncontrollable way.

Only one part of residual chlorides contained in spray roasted iron oxides is water soluble. The other part of residual chlorides in the order of a few 100 ppm $Cl^-$ still remains in spray roasted iron oxides. Furthermore varying data of the specific surface area (BET) of spray roasted iron oxides influence the formation of uniform crystal micro-structures.

Entrapped salt contents and their thermal decomposition products, associated with spray roasted iron oxides, cause at low as well as at high temperature ranges substantial corrosion on construction elements of industrial installations.

Depending on the mode of processing, three different types of spray roasted iron oxides are presently available as raw material for the production of iron and alloyed steel powders. There are so-called UPL-, PPP- and CPP iron oxides, which are available on the market. Spray roasted UPL-iron oxide originates from untreated waste hydrochloric acid pickle liquor from steel mills.

Spray roasted PPP-iron oxides are produced from up-graded pickle liquor involving prior separation of a large part of hydrochloric acid insoluble substances by filtration procedures. Spray roasted CPP-iron oxides are produced by means of chemical precipitation and filtering processing steps, causing a substantial reduction of some metallurgical substances.

The task of this invention is to find a method, as indicated in the introduction, for the production of iron—respectively micro-alloyed steel powders, which fulfill reproducible raw material requirements related to powder metallurgical aspects.

This task is accomplished according to the present invention, by a method which is described in claim 1.

By means of this invention, a method for the production of pre-treated spray roasted iron oxides exhibiting stabilized material properties, which may further be processed by iron and steel powder metallurgical means, has been created.

According to this invention spray roasted iron oxide exhibiting a specific surface area in excess of 2.0 $m^2/g$ and residual chlorides over 440 ppm $Cl^-$ are being used as starting materials, wherein after decreasing the residual chloride content to less than 100 ppm $Cl^-$ and the specific surface area (BET) to a pre-selected value of <10 $m^2/g$, preferentially between 0.1 and 2.0 $m^2/g$, reducing pre-sintered micro-granules exhibiting bulk densities in excess of 1200 $g/dm^3$ with gaseous reduction media, preferably with hydrogen, at higher temperatures, particularly under 1050° C., iron respectively micro-alloyed steel powders are being produced. Consequently the reaction product is cooled down to room temperature in reduced or inert atmospheres.

Surprisingly, it is possible by means of invented method to utilize spray roasted iron oxides exhibiting different chemical and physical properties, originating from the regeneration of waste hydrochloric acid pickle liquor, to make useable superior uniform iron oxide raw materials for the production of iron—respectively micro-alloyed steel powders.

According to the invention a method comprising multi stage processing is applied for the production of uniform spray roasted iron oxides and resulting iron—respectively micro-alloyed steel powders. These powders due to their inherent material properties are capable to close the gap between carbonyl-iron powders on one end and iron and steel powders, which originate from sponge iron or atomized steel powders on the other end. By means of this invention spray roasted iron oxides with or without prior chemical or physical up-grading treatments at steel mills yielding UPL-, PPP- or CPP-iron oxides in form of commodities become valuable raw materials for the production of steel powders. By means of invented iron oxide up-grading treatments iron—respectively micro-alloyed steel powders are produced, which exhibit reproducible homogenous material properties as requested by the powder metallurgical industry.

In this context spray roasted iron oxides exhibiting little contents of salts, predominant residual chlorides, preferably low contents of magnetic iron oxides, stable bulk density data and consistent specific surface areas and related predominant average primary particle size.

Based on preferably reduced salt contents, respectively residual chlorides (total $Cl^-$ in ppm), the bulk density, stable value of the specific surface area and the $Fe^{2+}$-content, the required reproducible powder metallurgical properties are ensured.

According to the invention it is possible to also transform contaminated and unstable spray roasted iron oxides into useable iron—respectively micro-alloyed. steel powders for powder metallurgical applications, wherein in a first process step spray roasted iron oxides are for example mixed with de-ionized water yielding a slurry, which is neutralized to a pH value of 7.0+1-1.0 by means of neutralizing agents. Consequently the slurry is filtered and the filter cake washed by mean of de-ionized water to an extend, that the original residual chloride content of the iron oxide is decreased by 50%, preferably by over 70% to less than 350 ppm Cl$^-$. The washed iron oxide is mixed with surfactants, wet milled, separated from magnetic substances by means of wet magnetic separation and the purified slurry doped with 0.5 wt. % binders. By means of spray drying the slurry it yields green micro-granules exhibiting diameters in the order of over 95% in the range of 5.0 μm to 300 μm.

The green micro-granulates, free of water soluble impurities, preferably undergo a second process step for the further removal of non water soluble residual chlorides by means of thermal decomposition, comprising a short heat treatment for a few seconds under oxidizing conditions in a radiation furnace at temperatures between 900° C. and 1350° C. yielding residual chloride levels in the order of less than 100 ppm Cl$^-$.

Furthermore, there are means provided to thermally treat the only little residual chlorides containing green iron oxide granules for a few seconds under oxidizing and radiant conditions at temperatures between 900° C. and 1350° C. yielding the pre-selected value of the specific surface area (BET) of resulting slightly pre-sintered iron oxide granules in the range of <10 m$^2$/g, preferably 0.1 to 2.0 m$^2$/g. Moreover the decomposition substances originating from granulation, suspension aids as well as moisture contents are removed from the system.

The pre-sintered iron oxide granules, exhibiting stabilized specific surface (BET) and residual chloride Cl$^-$ data are consequently reduced at temperatures below 1050° C., employing a loose layer bed mode, preferably with hydrogen. Resulting bulk density of reduced iron—respectively micro-alloyed steel powders exceeds 1200 g/dm$^3$ and the carbon content is less than 0.01 wt. %. During the short time under oxidizing conditions pre-sintered iron oxide granules experience upon decreasing specific surface conditions an increase in their crushing strength providing substantially less formation of dust during the reduction with hydrogen.

The reduction of slightly pre-sintered iron oxide microgranules with hydrogen may be accomplished by means of employing a bulk bed layer, a traveling fluidized bed, a circulating fluidized bed, a traveling grate, a rotary kiln or by means of a vertical indirectly heated unobstructed furnace.

For further refining of the specific surface data (BET) the pre-sintered iron powder micro-granules may be classified into mesh sizes. The different granule fractions exhibit only moderate deviations of their specific surface and residual chloride data. For specific powder metallurgical applications the granule fractions of classified iron—respectively microalloyed steel powders are mixed in order to comply with selected granule distribution specs.

Another advantage is, that the under radiant conditions processed pre-sintered iron oxide granules exhibit, after their reduction with hydrogen, a decreased tendency for surface sticking phenomena. In case of any bridging occurrence of granules it possible to des-agglomerate the granules by mean of a short mechanical interaction.

It is of further advantage to execute the oxidizing and reducing thermal treatments of the iron oxide micro-granules in one heat.

The invention comprises, prior dressing of spray roasted iron oxides for the production of iron—respectively microalloyed steel powders, preferably the destruction of fluffy hollow sphere iron oxide granules, preferably to lessen magnetic substances, the decrease of high residual chloride contents, the increase in bulk density, consistently stable specific surface areas (BET) expressed in m$^2$/g and a weak ceramic bond of iron oxide particles, classification of slightly pre-sintered micro-granulates in mesh fractions exhibiting only moderate differences in related specific surface area data.

Preferred powder metallurgical material properties are high dye filling density, good flow rate, narrow Gauss distribution of granules, consistent low level of salt contents, narrow fluctuation of specific surface area data, good green density of pressed parts, reliable reproducibility of tolerances and material properties, good edge stability of green compacts during the thermal treatment and the possibility to apply a moderate pressure in order to extend the life time of pressing tools.

It is of further advantage for the iron- and micro-alloyed steel powders produced in accordance with this invention, to add pressing aids and occasionally (re)-carburizing agents, metal powders, metal alloy powders, crystal growth inhibitors, additional micro-alloying substances and apply powder metallurgical processing procedures.

Another advantage of the invention is, that selected fractions of produced iron—respectively micro-alloyed steel powders may further be processed by injecting molding (MIM) techniques yielding shapes of metallic parts. The term MIM stands for Metal powder Injection Molding.

Furthermore it is possible to add prior processing pressing aids and alloy forming agents to related iron—respectively micro-alloyed steel powders with or without employing desagglomeration procedures.

BRIEF DESCRIPTION OF THE DRAWINGS

Based on following examples and the process flow sheet in FIG. 1, the invention will further be described to some detail.

EXAMPLE 1

Spray roasted PPP-iron oxide exhibiting a specific surface area of 4.2+/−0.25 m$^2$/g and a residual chloride content of 1.050 ppm Cl$^-$ was mixed with de-ionized water and further processed into a neutralized slurry by the addition of NaOH yielding a pH-value of 7.0. Afterwards the slurry was washed, using de-ionized water employing a vertical filter press. The residual chloride content was reduced after the washing process to 285 ppm Cl$^-$.

The washed filter cake was continuously milled employing a wet vibration mill, further processed by adding surface active surfactants employing for a short time an Attritor mill in order to prepare homogeneous slurry. The magnetic iron oxides were removed from the slurry by means of a wet magnetic separation unit.

The slurry was by intention prepared to exhibit a solid content of 67 wt. % and 0.5 wt. % of a binder have been added. Consequently the slurry has been spray dried under conditions in order to provide the correct granule size distribution for desired iron—respectively micro-alloyed steel powders. The bulk density of respective green granulates was 1420 g/dm$^3$.

In order to achieve a higher bulk density and lesser data of the specific surface area (BET) of pre-sintered on oxide granules in the order of 1.2 m$^2$/g, the green granules were exposed to a short thermal treatment of a few seconds employing a vertical furnace at a radiant temperature around 1.195° C. using an oxidizing atmosphere, At the same time the residual chloride contents decreased to 35 ppm Cl⁻. After discharging the granules from the vertical furnace, the hardened granules were directly transferred in one heat to the reduction kiln By means of provided thermal treatment the iron oxide micro-granules exhibited a specific surface area (BET) of 1.18 m²/g and a bulk density of 2.220 g/dm³. Upon classification and cooling down to room temperature the granule size distribution was as follows:

| | |
|---|---|
| +250 gm (60 mesh) | 0.8 wt. % |
| 250 to 125 μm | 6.5 wt. % |
| 125 up to 88 μm | 36.8 wt. % |
| 88 to 63 μm | 28.2 wt. % |
| 63 to 44 μm | 15.6 wt. % |
| −44 μm (325 mesh) | 12.1 wt. % |

The pre-sintered iron oxide granules were charged onto a indirectly heated rotary kiln and reduced in a counter current way with hydrogen for 60 minutes at a temperature of 870° C. The gaseous mixture of water and hydrogen underwent dew point processing and the regenerated hydrogen was recycled.

After discharging the reduction product under nitrogen to room temperature, the reduced micro-alloyed steel powder was mixed with 0.8 wt. % pressing aids, directly pressed into tablets and tested for its powder metallurgical properties. The results indicated following material properties:

| | |
|---|---|
| Bulk density: | 3.15 g/cm³ |
| Flow: | 30 s/50 g |
| Pressed density* at 600 MPa: | 7.25 g/cm³ |
| Carbon content: | <0.01 wt. % |
| H₂-loss | 0.12 wt. % |

*adding 0.8 wt. % pressing aids

EXAMPLE 2

Spray roasted CPP-iron oxide exhibiting a specific surface area of 6.5 m²/g+/−0.5 m²/g and a residual chloride content of 1.520 ppm Cl⁻ was mixed with de-ionized water and further processed into a neutralized slurry by addition of NaOH yielding a pH-value of 7.1. Afterwards the slurry was washed with de-ionized water employing a horizontal filter press, The residual chloride content decreased after the washing process to 485 ppm Cl⁻.

The washed filter cake was liquefied by adding surfactants, ball milled and charged to a sand mill in order to prepare a homogeneous slurry. The magnetic iron oxides were removed by means of a wet magnetic substances separation unit. The slurry was by intention prepared to exhibit a solid content of 78.5 wt. % and 0.8 wt. % of binder has been added. Consequently the slurry has been spray dried under conditions to prepare a large share of spay dried granules exhibiting less than 44 μm in diameter. The bulk density of respective granules was 1580 g/dm³.

In order to achieve a specific surface area of 1.95 g/m² the green iron oxide granules were exposed for a few seconds to a short heat treatment within a vertical furnace operating at a temperature of 1.125° C. At the same time the residual chloride content decreased to 35 ppm.

The bulk density of thermally pre-sintered iron oxide granules was 1.760 g/dm³. Upon classification the granule size distribution was as follows;

| | |
|---|---|
| +250 μm (60 mesh) | 0.1 wt. % |
| 250 to 125 gm | 8.1 wt. % |
| 125 to 88 gm | 18.3 wt. % |
| 88 to 63 .gm | 28.3 wt. % |
| 63 to 44 μm | 14.2 wt. % |
| 44 gm (325 mesh) | 31.6 wt. % |

The hot granules were charged onto an indirectly heated rotary kiln and reduced in a counter current way with hydrogen for 52 minutes at a temperature of 855° C. The gaseous mixture of water and hydrogen underwent dew point processing and the regenerated hydrogen was recycled.

After discharging and cooling the reduction product under clean nitrogen to room temperature the reduced iron powder was mixed with 0.65 wt. % pressing aids, directly pressed and tested for its powder metallurgical properties. The results indicated following material properties;

| | |
|---|---|
| Bulk density: | 2.45 g/cm³ |
| Flow: | 25 s/50 g |
| Pressed density at 600 MPa: | 7.05 g/cm³ |
| Carbon content: | <0.01 wt. % |
| H₂-loss: | 0.09 wt. % |

*adding 0.65 wt. % pressing aids

What I claim is:

1. A method for manufacturing of iron powders or micro-alloyed steel powders for powder metallurgical applications, comprising the following process steps:

spray roasted iron oxides, originating from waste hydrochloric acid pickle liquors, exhibiting a specific area in excess of 2.0 m²/g and total residual chlorides over 400 ppm Cl⁻, are used as a raw material source, and are in a first process step, mixed with water yielding a slurry and at least one neutralization agent is added into the slurry, exhibiting pH-data in the order of 7.0±1.0 and yielding upon filtering the slurry, a filter cake, and in a second process step, the water soluble chloride contents of the iron oxides are reduced by washing the filter cake with water, resulting in the total residual chlorides being reduced to less than 350 ppm Cl⁻, and in a third process step, the washed filter cake is transformed by wet milling and the addition of surfactants and binders into a suspension and then is spray dried into green iron oxide micro-granules, exhibiting diameters in the order of over 95% in the range of 5 μm to 300 μm, and in a fourth process step, the iron oxide micro-granules are transformed into pre-sintered iron oxide micro-granules by a short thermal treatment for a few seconds under oxidizing conditions at temperatures between 900° C. and 1350° C., such that the pre-sintered iron oxide micro-granules exhibit lower specific surface area and at the same time the non-water soluble residual chloride content is further reduced, and in a fifth process step, the pre-sintered iron oxide micro-granules are reduced by gaseous reduction media, yielding reduced iron powders or micro-alloyed steel powders exhibiting a bulk density in excess of 2450 g/dm³, and the reduction product is cooled to room temperature employing a reducing or inert atmosphere.

2. The method for manufacturing iron powders or micro-alloyed steel powders according to claim 1, comprising reduction of the total residual chloride level of pre-sintered iron oxide granules to less than 100 ppm and the specific surface area (BET) to a selected value of less than 10 m²/g.

3. The method for manufacturing iron powders or micro-alloyed steel powders according to claim 1, wherein magnetic materials are separated from the iron oxide suspension.

4. The method for manufacturing iron powders or micro-alloyed steel powders according to claim 1, wherein for the further reduction of chlorides the green micro-granules are heat treated for a very short time at temperatures around 900° C. up to 1350° C., preferentially for a few seconds under radiant heat causing a weak ceramic bond among iron oxide particles and decrease the total residual chloride content to less than 100 ppm $Cl^-$.

5. The method for manufacturing iron powders or micro-alloyed steel powders according to claim 1, wherein the surface of the pre-sintered granules are decreased to a pre-selected and consistently stable specific surface area (BET) between 0.1 and 2.0 m²/g.

6. The method for manufacturing iron powders or micro-alloyed steel powders according to claim 1, wherein the pre-sintered iron oxide micro-granulate is reduced at temperatures of less than 1050° C.

7. The method for manufacturing iron powders or micro-alloyed steel powders according to claim 1, wherein the iron oxide micro-granulate is reduced with hydrogen.

8. The method for manufacturing iron powders or micro-alloyed steel powders according to claim 1, wherein the oxidizing thermal treatment of green granules and the reduction step are carried out in one heat.

9. The method for manufacturing iron powders or micro-alloyed steel powders according to claim 1, wherein after the reduction step the pre-sintered micro-granulates consisting of iron powder or micro-alloyed powder are classified into mesh sizes.

10. The method for manufacturing iron powders or micro-alloyed steel powders according to claim 1, wherein produced iron powders or micro-alloyed steel powders are cooled under a reducing or inert atmosphere.

11. The method for manufacturing iron powders or micro-alloyed steel powders according to claim 1, wherein the iron powders or micro-alloyed steel powders are predominantly further processed by powder metallurgical techniques.

12. The method for manufacturing iron powders or micro-alloyed steel powders according to claim 1, wherein the iron powder or micro-alloyed steel powder is directly further processed by pressing operations.

13. The method for manufacturing iron powders or micro-alloyed steel powders according to claim 1, wherein the iron powder or micro-alloyed steel powder is mixed with pressing aids and further processed by pressing into structural shapes.

14. The method for manufacturing iron powders or micro-alloyed steel powders according to claim 1, wherein the iron powder or micro-alloyed steel powder is doped with re-carburization agents, crystal growth inhibitors, metal powders, metal alloys, micro-alloying agents or alloy forming agents.

15. The method for manufacturing iron powders or micro-alloyed steel powders according to claim 1, wherein an iron powder or micro-alloyed steel powder size fraction is further processed by injection molding processes employing soluble thermoplastic materials as a binder.

16. The method for manufacturing iron powders or micro-alloyed steel powders according to claim 1, wherein the total chloride level is reduced by an excess of 70%.

* * * * *